INVENTORS
HOWARD J. BRONSON
FREDERICK W. JOHNSON
MARVIN D. WELTHA
BY
ATTORNEY

A soldering machine for conveyor carried continuous

United States Patent Office 3,515,330
Patented June 2, 1970

3,515,330
CONTINUOUS FLOW MASS PIN-TO-BOARD HOT AIR SOLDERING DEVICE
Howard J. Bronson and Frederick W. Johnson, Cedar Rapids, and Marvin D. Weltha, Marion, Iowa, assignors to Collins Radio Company, Cedar Rapids, Iowa, a corporation of Iowa
Filed Jan. 30, 1968, Ser. No. 701,720
Int. Cl. B23k 1/00
U.S. Cl. 228—8    14 Claims

ABSTRACT OF THE DISCLOSURE

A soldering machine for conveyor carried continuous through flow mass soldering of pins to circuit boards in one pass through a hot air soldering oven. Close control is provided in hot air circulation, temperature distribution including automatic thermostatic zone control, hot air velocity and delivered impingement directed angle to the joints being processed, and in controlled hot air bleeding and input drawing of make-up air. Operator conveyor speed control is also provided.

---

This invention relates in general to the soldering of connector pins to pads on printed circuit boards, and, in particular, to a continuous through flow soldering machine that utilizes channel directed hot air for mass soldering pins to boards with the pins having been pressed into and through circuit boards and employing doughnut or washer-shaped solder preforms placed on each pin.

In order to mass solder pins pressed into circuit boards on any length board up to, for example, 24 inches wide and with pin length projection up to 2 inches to one or both sides of a board, a soldering facility with considerable capacity and flexibility is required. Close control of all critical soldering variables must be maintained such as, for example, to limit height of solder wicking up the pins to 0.055 inch, and such additional control requirements are imposed as to eliminate from use substantially all soldering facilities and techniques heretofore employed. With respect to some of these techniques there are shortcomings such as, with immersing of circuit boards in hot oils the creation of fire hazard, contamination of boards, and with this approach solder fillet wicking height is not limited. Pin masking as would be required with wave and dip soldering simply is not practical. Hand iron soldering is too tedious and slow and does not ensure work product uniformity and quality desired. With radiant heat soldering, board material having a higher heat absorption factor than the pins tends to overheat. Forced air heat guns were the most promising of the pre-existing approaches but produced poor solder joints in fringe areas with unbalanced heating and limited heating capacity. Testing with the use of a plurality of air heat guns indicated that good solder joints were obtained with quantitative control of variables such as air temperature to a 300° to 325° C. range, air velocity in the range of 1300 to 1600 feet per minute, and with a hot air delivery angle approximately 25° from a vertical relative to the circuit board being pin soldered. If hot air velocity is too high, solder is forced to one side of the pins, and if air temperature is too high, excessive solder wicking up the pins occurs. Further, excessive wicking can also occur if the hot air delivery angle is too shallow relative to the surface plane of the board being pin soldered.

It is, therefore, a principal object of this invention to provide mass soldering, on a continuous flow basis, of pins pressed into and through circuit boards.

Another object is to provide in a soldering machine for soldering pins to circuit boards such control of the soldering variables that pin to board joints are mass soldered uniformly across a soldering zone with controlled uniform limited wicking up the pins and predictably uniform joint impedances.

Further objects with such a hot air soldering device are optimum hot air delivery impingement angle to the boards and close range thermostat temperature controlled heating of the air in the machine, and further, limited range transverse zone temperature control.

Features of the invention useful in accomplishing the above objects include, in a continuous flow mass pin-to-board hot air soldering machine, a conveyor, upon which the tray mounted circuit boards with pins to be solder connected are placed. The conveyor extends into the input end opening of a soldering oven, through the oven, and out the output end opening of the oven for continuous soldering process through pass conveying of tray or pallet mounted circuit boards through the soldering oven. Air leaks are partially controlled by depending ribbon input opening and output opening air curtains for minimized undesired interchange of outside air with inside air and to insure optimized stabilization of soldering environmental conditions. There is an internal air flow circulation path established within the oven with a heating and space travel zone provided for preheating of the boards with conveyor travel immediately after they enter the oven. Further, the heated air is directed toward the joints to be soldered at an angle of approximately 25° from the vertical, and this heated air is the same air contributing to and constituting the bulk of the air in the internal air flow circulation path within the oven itself. This air in its circulation passes from a metering outlet provided through a transverse channel perforated metering plate in optimally vertically spaced position over the boards in a board and pin preheating flow after initial impact on the pin soldered joints, as they are being processed and passed through the machine with the circuit boards. The internal hot air flow passes to the inlet area end of the heater where this air, along with some input make-up air drawn in through the depending ribbon input air curtain is passed upwardly through a heater zone. After the heater zone the heated air passes through a blower system to a mixing plenum chamber having a main air flow depending tranversely extended channel for hot air delivery to the circuit boards, and with the main channel generally slanted to optimize the desired delivery angle of hot air toward the pin to board joints being soldered. An additional secondary relatively low flow small transversely extended channel is provided from the plenum chamber extending downward at a slant toward the outlet air curtain section of the machine in order to provide a positive air outlet directed flow of heated air to effectively prevent any harmful input of cold outside air at this particular portion of the oven. The air metering plate includes perforations approximately one-eighth inch in diameter in generally uniform distribution transversely across the air outlet from side to side through the oven with some larger holes added for further hot air flow balancing. This helps ensure that plenum chamber pump generated pressures provide air velocities, directed down on the soldered joints and across the circuit boards as they are fed through the machine fall within the range of 1300 to 1600 feet per minute across the full width of the oven.

While a lobe type blower could be used extending transversely across the oven of the machine three small standard blowers were employed in a working embodiment in place of one large blower to minimize machine size. The three blower approach gave an adequately even distributed air stream into the mixing plenum chamber particularly with the three blowers so spaced as to provide substantially equal inlet area for each blower. This arrangement also resulted in sufficiently uniform air flow through the heater element stack zone area to prevent local hot spots that otherwise could easily cause early heater element failures. The three blowers are driven from one shaft by a motor located at the back of the machine with blower shaft bearings mounted on the external walls of the machine, for minimized heat problems and with the blower shaft necked down where it is passed through the insulated walls in order to reduce heat flow through the shaft bearing interface areas. The air in circulation through the oven is heated by sixteen Nichrome wire elements with each element dissipating approximately one kilowatt of electrical energy. These heating elements are arranged with ten of the wires strung across the entire width of the heating stack and with the additional six wires so strung that the heating area is transversely divided into three substantially equal zones, and with two wires zigzagged in each of the zones. In order to provide reasonably close control in heating of the air and operationally acceptable air temperature tolerance control within the oven, five of the wires strung completely across the oven are continually on as long as the machine is in operation to nearly handle the no-load losses of the machine, and the other five extending completely across the machine are subject to thermostat actuation. One of two thermostats aligned with the output of each blower in the plenum chamber controls the two one kw. heater elements of the respective heating zone upstream from the respective blower. The other three thermostats individually aligned with respective blowers are each individually capable of actuating the five of the heating elements strung transversely entirely across the oven heating section. This provides that any one of three thermostats can simultaneously turn on five thermostat controlled heaters for use during warm-up and during heavy soldering loads when the individually actuated zone heaters are not adequate.

In order to attain the desired operational results, the thermostats for the respective zone heaters are set to call for heat actuation at a higher temperature than the other thermostats. In other words actuation of zone heaters first as temperature drops has worked particularly well in providing the heating flexibility required for unbalanced loads. Air temperature distribution obtained with this system provides a temperature spread across the machine at the air outlet to the soldering zone of approximately 5° centigrade or less for no-load conditions and for a severely unbalanced load a spread of at most approximately 12° centigrade. The average air outlet temperature to the the soldering zone is 315° centigrade without load and about 305° centigrade with normal loads, and with a continuous load of boards two feet wide, the temperature at the outlet to the soldering zone is generally held above 300° centigrade.

A specific embodiment representing what is presently regarded as the best mode for carrying out the invention is illustrated in the accompanying drawings.

Figure 1:
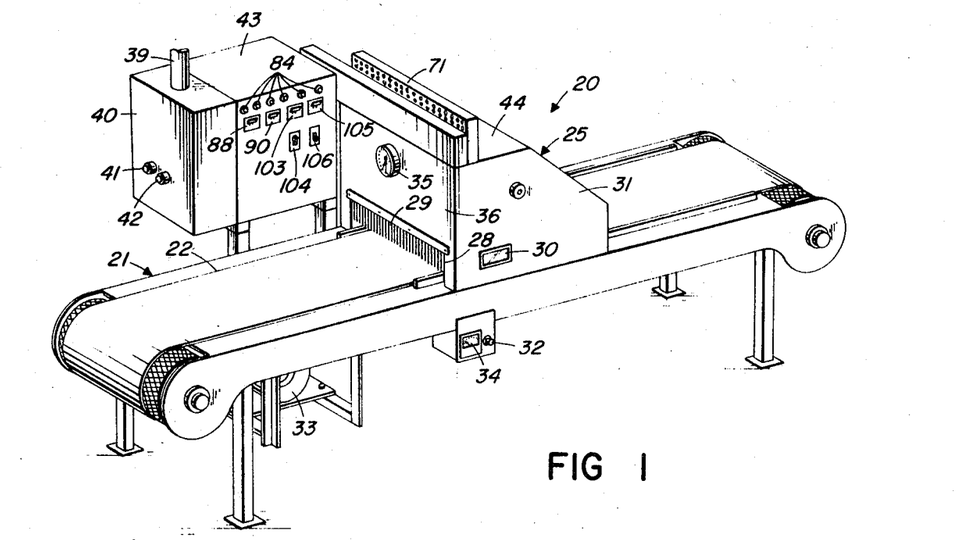
FIG. 1 represents a perspective view of applicant's continuous flow mass pin-to-board hot air soldering machine showing the conveyor outlet end and operator's side of the machine.
Figure 2:
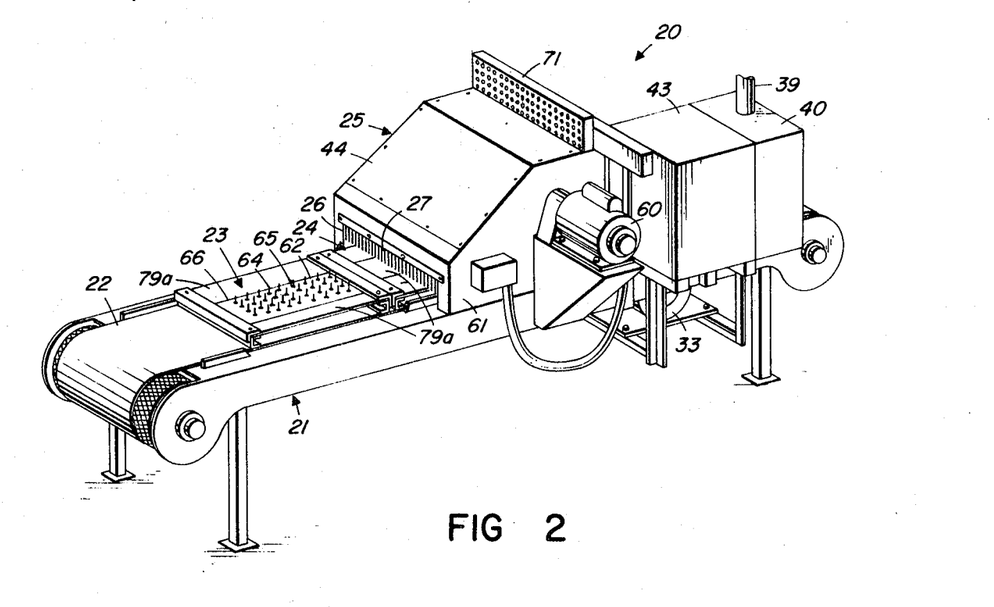
FIG. 2, a perspective view from the opposite corner of the machine showing the conveyor input end with a circuit board mounted in a tray ready to enter the machine, and the back blower motor side of the machine.
Figure 6:
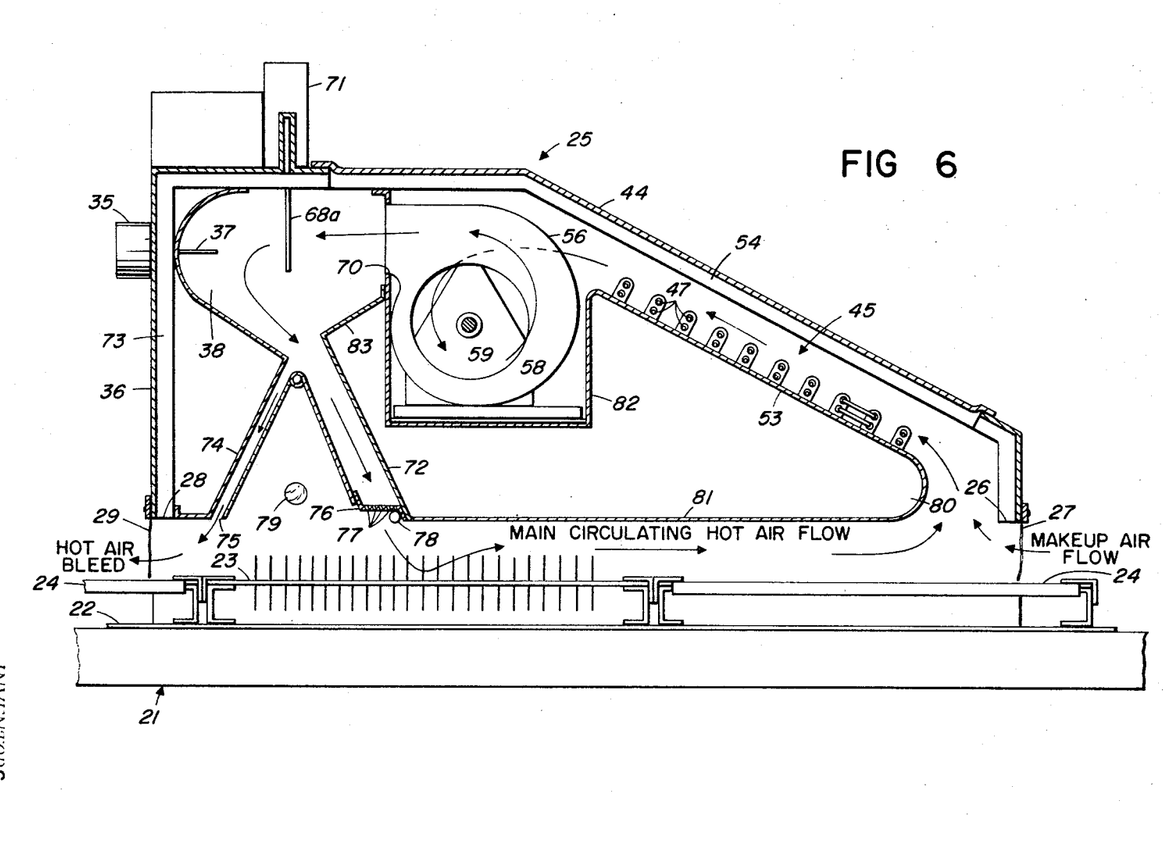
FIG. 6, a section along a vertical plane passed through the oven portion of the machine from inlet to outlet with the operator's side of the oven from the plane lifted away and showing interior detail and a circuit board being conveyor-belt carried through the machine.

Referring to the drawing:

The continuous flow mass pin to board hot air soldering machine 20 of FIGS. 1 and 2 is shown to include a conveyor structure 21 with a conveyor belt 22 designed for the placement thereon at the input end of the machine of circuit board mounting tray assemblies 23 and/or filler tray assemblies 24 for continuous feeding into and through the continuous pin to board soldering oven 25 of the machine. The oven is provided with an input opening having a depending ribbon air curtain structure 27, and with an output opening 28 having a similar depending ribbon air curtain structure 29. An observor's window 30 is provided in the operator's insulated sidewall 31 of the oven 25 in order that the operator can observe the continuous soldering action taking place in the machine as the circuit boards and pins are being passed through the hottest air impingement point of the oven. This enables the operator to adjust the conveyor belt speed control 32 for obtaining the desired soldering operational results in one pass of boards and pins through the machine. Speed control 32 governs the speed of conveyor drive motor 33 and conveyor speed is indicated by the speed indicating instrument 34 located adjacent to the conveyor speed control 32. A dial thermometer 35 is mounted on the output end insulated wall 36 of the soldering oven 25 in order that the temperature sensed by its temperature probe 37, extended into plenum chamber 38, as shown in FIG. 6, may be readily observed by the operator of the machine. An electrical power line 39 input box 40 with a machine start button 41 and a machine stop button 42 is suitably mounted on the machine and distributes power for the heating element, conveyor and blower power control box 43 of the machine.

Figure 3:
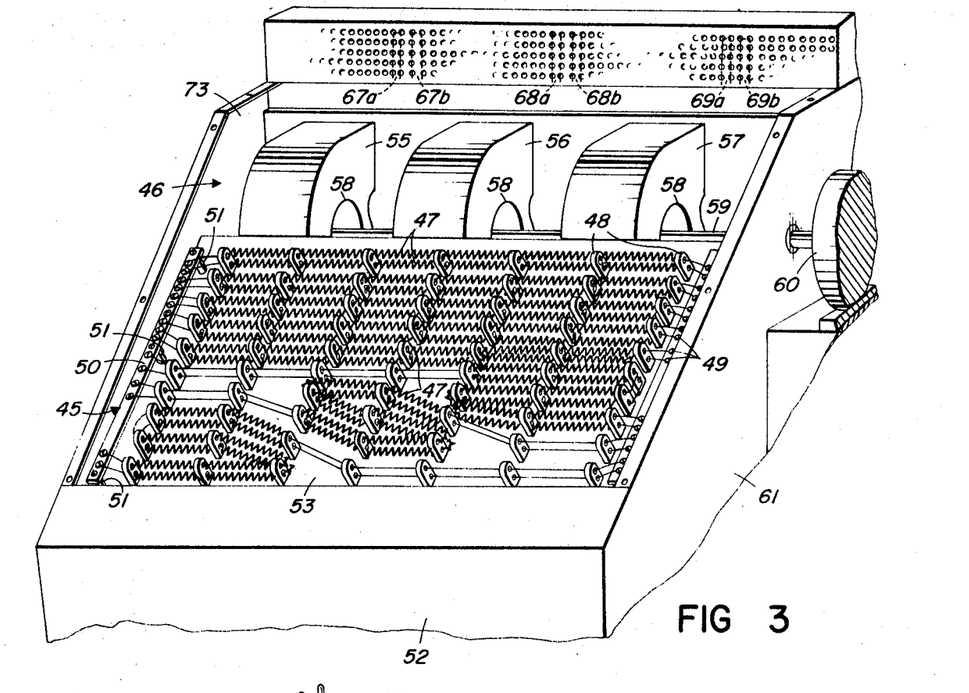
FIG. 3, a perspective view downward to the interior of the heating coil and blower portions of the oven with a top cover removed.

Referring also to FIG. 3, a top cover 44 has been removed to expose a heating element equipped chamber 45 and a blower section 46 to view. The heating chamber 45 includes sixteen heating coil wires 47 that are mounted on multiple insulating material support standoff members 48. The wires 47 are connected to multiple respective power input leads 49 at one side of the heating chamber 45, and, at the other side of the heating chamber, they are connected to a neutral bus bar 50 mounted in insulated spaced relation from the chamber housing by insulating material support members 51. The heating coils 47 are advantageously spaced generally throughout the heating chamber from the oven input end wall 52 to adjacent the blower section 46 and in spaced relation between the heater chamber bottom wall 53 and internal insulation 54 of the top cover 44. In the blower section 46 to which air is drawn substantially uniformly through the heater section 45 three relatively small standard blowers 55, 56 and 57 of scroll type configuration are used rather than one large blower in order to minimize machine size and to deliver a somewhat evenly distributed air stream into the mixing plenum chamber 38. The blowers 55, 56, and 57 are spaced in offset relation toward the left in order to provide substantially equal inlet area for each blower since the inlet openings 58 of each is on the right side as viewed in FIG. 3. This blower structure results in sufficiently uniform air-flow through the heater stack of the heating chamber 45 to prevent local hot spots that could cause early heating element failures. The blowers 55, 56 and 57 are shaft 59 driven by a blower motor 60 mounted to the outside of the back oven wall 61 of the machine. Referring again to the heater stack in the heating chamber 45, the 16 heating coil elements 47 may be, for example, Nichrome wire coiled elements each dissipating approximately one kilowatt of electrical energy. Ten of the heating coil elements 47 are strung across substantially the entire width of the heating stack and the remaining six heating coil wires are strung so that the heating chamber area is divided into three substantially equal heating zones, a bus bar 50, side zone, a middle zone, and a motor side zone. This is with two of the heating coil wires 47 zig-zagged in each zone substantially in operational alignment in the airflow stream with respect to the airflow being drawn to respective inlets 58 of the blowers 55, 56 and 57. Reasoning for this structural arrangement becomes more evident with further discussion of the air temperature airflow control system discussed in further detail hereinafter.

Figure 4:
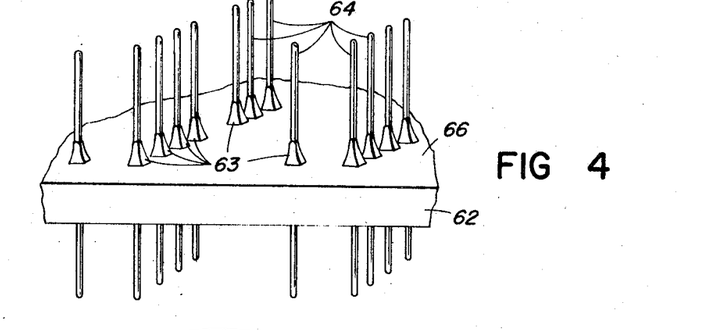
FIG. 4, a partial perspective view of a circuit board showing finished solder pin-to-board joints provided in a pass through the machine.
Figure 5:
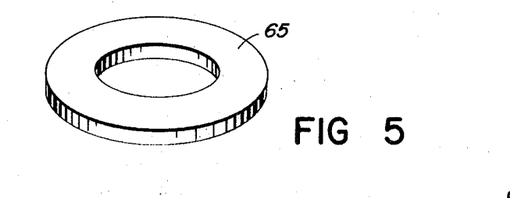
FIG. 5, a typical doughnut or washer-shaped solder preform that is placed on each pin prior to passage of a board through the machine.

Referring also to FIG. 4, a partial view of a circuit board 62 illustrates finished pin soldered to board filleted joints 63 such as provided with a single pass of the board through the machine. A continuous mass flow pin to board hot air soldering machine 20 that has been put to use has proven capable of mass soldering as many as 7500 pins per minute on a continuous flow basis. This is with pins 64 pressed into and through plated through holes in a circuit board being soldered in one pass through the machine with pins being approximately 0.025 inch square in cross section and projecting upward and with some also downward from the board to as much as two inches in either or both directions. The soldering variables have been shown to be so controlled that the soldered joint fillets 63 are mass soldered uniformly across, as much as, an entire 24 inch wide soldering zone. The soldering material is provided individually for each pin-to-board joint in the form of doughnut-shaped or washer preforms 65 placed on each pin 64 before the boards enter the hot air soldering machine in order to insure an adequately uniform supply of solder in the forming of each of the solder filleted joints 63 for the pin-to-board connections. With this approach solder wicking up the pin has been controlled so that no appreciable wicking occurs beyond, for example, 0.055 inch above the boards upper surface 66. Actually in practice two different solder preform sizes have been employed with a thicker preform with more solder material being used for 1/8" thick circuit boards having plated through holes and a thinner solder material preform being used on 1/16" thick circuit boards also having plated through holes. However, it has been found that the particular size and shape of the solder material preforms 65 is not as critical a factor as would be suspected when proper air velocity and temperatures are employed in the hot air soldering machine.

Referring also to FIG. 6, close control of the temperature throughout the air stream being delivered to the plenum chamber 38 and in circulation through the system, is achieved in part by the positioning of thermostats 67a and 67b, 68a and 68b, 69a and 69b generally transversely located with two in alignment with each outlet opening 70 of the blowers 55, 56 and 57 respectively. These thermostats 67a through 69b have an upper portion contained within ventilated enclosure 71 and a sensing extension from each extending downward into the plenum chamber 38 into appropriate alignment to be in the air flow outlet from the respective blowers. The thermostats 67a, 68a, and 69a in front of each blower outlet controls two of the one kw. heater coils 47 zigzagged in the respective heating zone, the bus bar or operator's side zone, the middle zone and the motor side zone respectively, that are upstream from the blowers 55, 56 and 57, respectively. Thus the zone heaters are controlled for turn on only when the respective thermostat 67a, 68a or 69a senses cooler air than a preset temperature control threshold coming from the respective zone only. The second thermostat 67b, 68b and 69b, in line with the respective blower outlet openings 70 are each effective to control heating activation of five of the one kw. heating coils 47 transversely strung the entire width of the heating stack so that any one of the three b thermostats is operationally effective to initiate turn-on of all five of these particular heating coil elements 47. These thermostatically control full width heating elements 47 are used during warm-up and during heavy soldering loads when the zone heaters are not adequate in meeting the heating loads imposed. Good operational results have been obtained with setting of the thermostats 67a, 68a, and 69a for the zone heater heating coil elements 47 to activate the respective zone heaters to the heating state at a higher temperature level than with the other thermostatic controlled heating coil elements so that the zone heating elements are turned on first as air temperature is dropping in the oven 25. This temperature control approach has been working very well in providing the heating flexibility required for meeting the demands imposed by unbalanced loads. Note again at this point that only eleven of the sixteen heating elements 47 are thermostatically controlled with the remaining five elements being on all the time that the machine is being warmed up and in operation to nearly handle the no-load losses of the machine.

The three blowers 55, 56 and 57 deliver high velocity hot air to the mixing plenum chamber 38 which is of such volume and so shaped as to optimize the desired mixing of the hot air delivered thereto. Chamber 38 is equipped with a blower exit nozzle chute 72 that extends downwardly at an angle from the vertical of approximately 25° and with this inclined angle being toward the input end of the machine although the plenum chamber and its associated structure is located generally adjacent the output end wall 36 of the oven. The plenum chamber 38 and the hot air outlet nozzle chute 72, that forms the outlet for the bulk of hot air flow out of the plenum chamber 38, extend transversely across machine between the insulation 73 on the interior of side walls 31 and 61 of oven 25. Please note that insulation 73 is employed on the internal walls of the oven, front, back, sides and top along with insulation 54 inside cover 44. This is with insulation generally 1" thick board-like material with a thermal conductivity factor of, for example, 0.02 b.t.u. per hour per ° F. per square foot. The particular insulation material that has been used is identified as MIN-K 1301 with the set forth thermal conductivity rate being quite similar to that of dead air space. Aluminum foil has been used to cover the board-like insulation material on all internal surfaces, and with this insulation the outer surface of the machine has been found to run up to a maximum of 167° Fahrenheit with the hottest spot located on top cover 44 over the the heating stack area. A relatively narrow hot air bleed chute 74 extends down at an inclined angle of approximately 25° angle from the vertical with, however, this angle being inclined oppositely from the angle of nozzle chute 72, and toward the outlet opening 28 of oven 25. This hot air bleed chute 74 also extends transversely the length of the plenum chamber 38, and has its lower outlet 75 so positioned relative to outlet opening 28 and the depending ribbon air curtain 29 as to optimize such bleed airflow delivery thereto, particularly with trays and circuit boards in operative position on conveyor 22 therebeneath, as to prevent cold air from entering the circuit board exit end of the machine.

As shown in FIG. 6, air metering is provided at the bottom hot air outlet end of nozzle chute 72 by a perforated sheet 76 extended transversely through the full width of the oven interior coextensively with the plenum chamber 38 and chute 72. Perforations 77 provided generally throughout the transverse extent and width of the chute nozzle end 72 are, in a working embodiment, mostly 1/8 inch in diameter and some larger holes are added for further flow balancing. Further, the perforations 77 are so slanted throughout the sheet stock 76 as to optimize the angular impingement of the air metered therethrough in its passage down to the soldered pin-to-board joint fillets 63. With this arrangement room temperature air velocity passing pin-to-board joints was found to vary from 1450 to 1600 feet per minute across the full width from side to side of the machine as measured four inches downstream from the chute 72 hot air outlet soldering zone on boards being carried through the machine. A transversely extended oven side-to-side air attachment rod 78 is provided at the oven input end edge of the perforated sheet 76 to provide a curved surface for guiding hot air being metered out of chute 72. The hot air flow tends to attach to the rod 78 in making a turn uniformly in its circulation through the machine with minimum turbulence at this hot air feed point. It has been found that the machine does not solder uniformly without rod 78 or an equivalent curved surface at the same location.

The main circulation of hot airflow through the machine is generally as indicated by the larger, more lengthy, arrows in FIG. 6. The smaller arrows at the output end of the oven 25 are indicative of the hot air bleed flow provided at the base of the air outlet opening duct 75 in order that no cold air mixing be tolerated at this point or anywhere in the vicinity of the soldering zone within the oven. A sufficient volume of hot air is deliberately leaked at the circuit board exit end of the machine in order to ensure that all cold make-up air taken in through the input opening 26 at the other end of the oven is passed across the heating elements 47 and thoroughly mixed with recirculated heated air through the blowers 55, 56 and 57 and the plenum chamber 38 before being directed to the soldering zone. Please note that the make-up airflow arrows are substantially the same size and length as the hot air bleed arrows since this make-up air is of substantially the same volumetric quantity as that lost via the hot air bled from the machine in an air control system that has been providing excellent work results. Please note at this point that all trays are positioned in back-to-back abutting relation on conveyor 22 in order that they completely fill the machine oven 25 so that air turbulence across the boards is minimized and also so that no hot air contact the bottom surface of the boards, and further, to minimize hot air escape under the air curtains. Note that the trays 23 and 24 make use of filler sheets of metal 79a of various widths in the tray assemblies not carrying any boards to present a planar surface extending the full width of the machine in advantageously maintaining the desired airflow confinement and uniformity regardless of board load size. Such filler metal plates 79a are also used to one or both sides of trays 23 mounting circuit boards to fill out the trays 23 to one or both sides of relatively narrow circuit boards being processed through the machine to help sustain desired airflow uniformly across the boards being soldered. This also beneficially protects the belt 22 from undue heat charring therebeneath.

The machine, as constructed, has been capable of soldering pins to board with boards of substantially any reasonable length and up to 24″ wide. With the hot soldering air circulation, as shown in FIG. 6, belt speed is the only variable controlled by the operator. He observes the soldering action through observation window 30 as it occurs with hot soldering air impingement against the pin-to-board joints in the area under the outlet of chute 72. Light bulb 79 is located on the inside of back oven wall 61 to give ample illumination for the observer to view the soldering action and finished solder fillet joints 63 as the board trays 23 are passing through the machine. The operator in controlling conveyor belt speed via the speed control knob 32 determines proper board speed for different boards, for example, with 1/8″ thick boards, the operator adjusts for a normal speed of about 1¼ feet per minute and with a 1/16″ thick board for a speed of travel at approximately 2 feet per minute. Please note also at this time that a dead air volumetric space is defined within chamber 80 with the chamber being enclosed by a wall of hot air chute 72, a bottom wall 81 in parallel spaced relation from trays 23 and 24 being carried through the machine by belt 22, the bottom wall 53 under the heating stack, the blower containing air manifold box 82, plenum chamber 38, wall 83, and the front and back oven walls 31 and 61.

Figure 7:
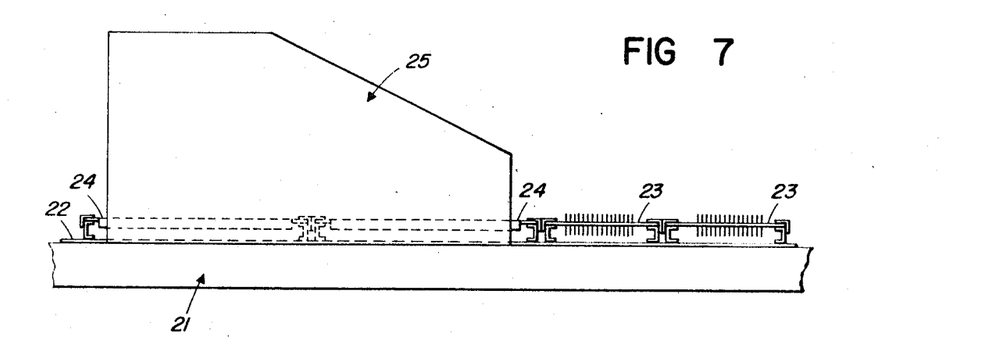
FIG. 7, a partial side view showing filler trays in the oven that must be kept therein during machine oven warm-up and at all operational soldering heated times except when soldering trays are in the machine.

Before switching the machine on for oven 25 warm-up it is important that two filler 79a equipped trays 24 be positioned inside the machine as shown in FIG. 7 since without such filler equipped trays 24 the temperature distribution and air velocity profile will not provide optimum soldering conditions and the warm-up period would be extended longer than normal. Further, these filler trays 24 during the warm-up period and as used in the machine except when soldering trays are being processed therethrough prevent scorching of the belt 22. During the machine oven warm-up period the blower motor 60 and all heaters are turned on with the warm-up period normally approximately fifteen minutes long. This is with the temperature control thermostats automatically being activated to the ON state and with the thermometer 35 being read to insure that the proper temperature is reached before operational mass soldering may be commenced and the conveyor started for through mass soldering.

Figures 8, 9:
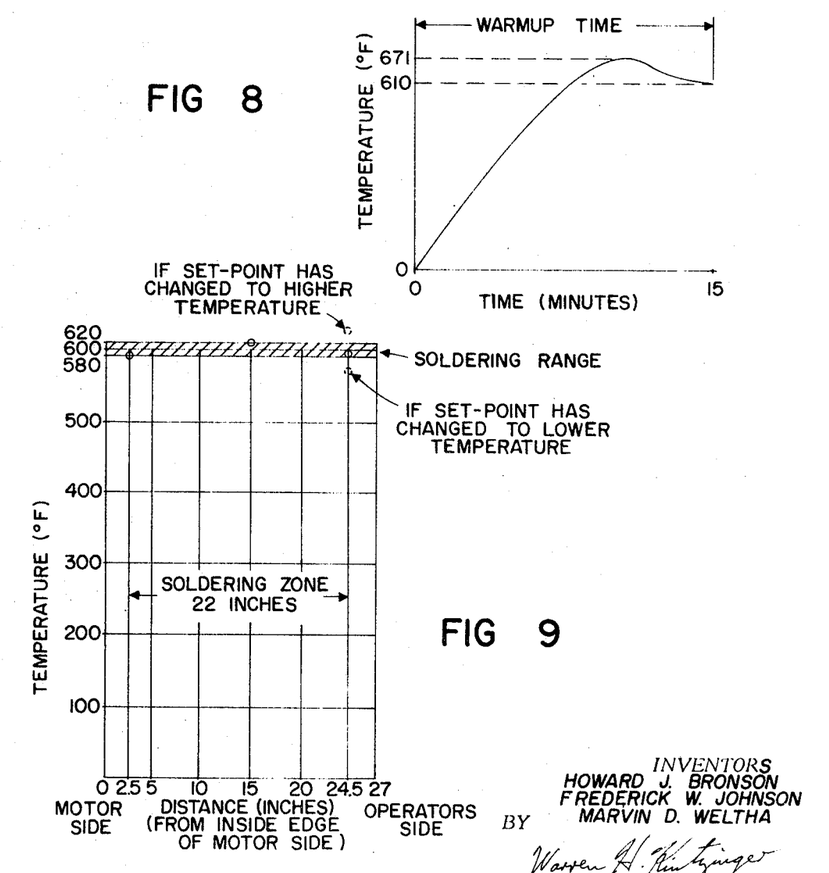
FIG. 8, a graph of warm-up period temperature vs. time illustrating temperature overshoot until the thermostat controls are temperature stabilized.
FIG. 9, a graph of temperature distribution transversely through the machine oven from the back blower motor side to the operator's side.

During the relatively short fifteen minute warm-up period the temperature as indicated by the thermometer 35 and as it actually exists within the plenum chamber reaches approximately 675° F. in the manner as illustrated by FIG. 8. This is so since the upper head portions of the thermostats 67a through 69b are within the ventilated chamber 71 and outside the plenum chamber 38 and are actually part of the thermo expansion circuit of the respective thermostats. Thus, until the machine oven 25 reaches a stable temperature the thermostat control heads are at a low temperature with the thermostats as a consequence overshooting in their temperature controlling thresholds until the thermostat heads thereof are heated sufficiently after the first fifteen minutes of warm-up and settle down to maintaining the machine within the temperature range of approximately 600 to 620° F. during normal continuous mass soldering operation.

If uniform solderability is not achieved there may be some trouble with thermostats and the temperature distribution measured across the nozzle chute 72 outlet may not agree with soldering range of FIG. 9 in the steady state condition. Please note again the two types of temperature control provided in the machine; zone temperature control and full width temperature control. If the temperature distribution is not within the range shown in FIG. 9 the set point of any one of the six thermostats 67a through 69b could have been to a different undesired shifted temperature controlling threshold set point. For example, if a particular thermostat set point were shifted upward it would be on and one indicator light 84, of the circuit lights 84 shown on the panel 43, in FIG. 1, representing that particular thermostat controlled circuit and the respective activated heater elements 49 would be turned on. If it is a particular zone heating control circuit, the temperature for that zone will be high. In the same manner if the set point of the thermostat of the same circuit has been shifted downward the circuit is turned off at a lower temperature with temperature of that temperature controlled zone then running lower than the desired soldering range.

Figure 10:
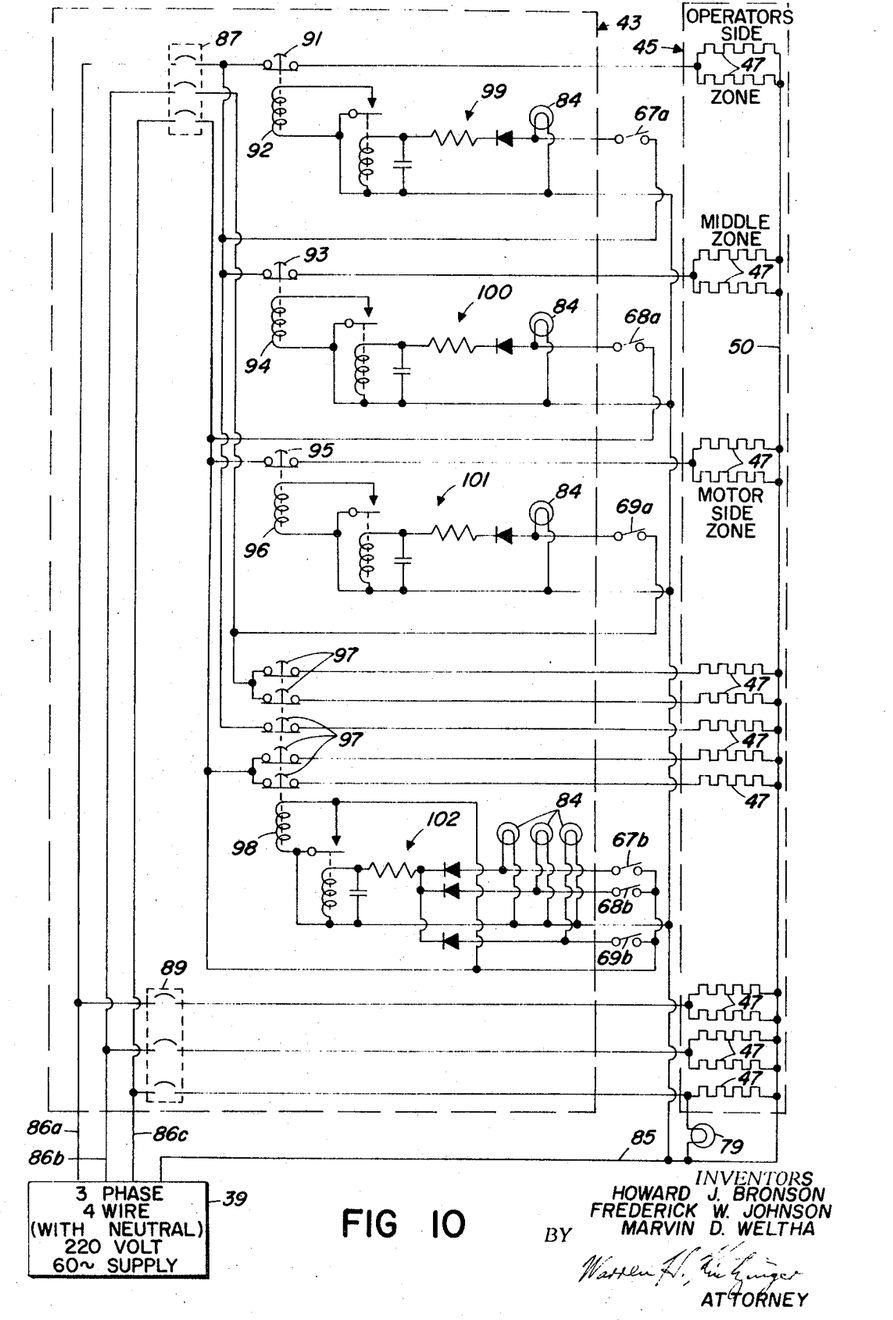
FIG. 10, a schematic diagram of heater element control circuitry.

Reference at this point to the schematic diagram of FIG. 10 should prove helpful in providing further heater coil element 47 control circuitry detail and also some of the other control and indicating circuitry detail. The three-phase four-wire with neutral 220 volt 60 cycle supply 39 is shown to have a neutral line 85 line connected to the neutral bus bar 50. The three lines 86a, 86b and 86c of the three phase 220 volt 60 cycle supply are connected to and through circuit breaker 87 which is controlled by circuit breaker switch 88 on power control box 43. The three phase power lines 86a, 86b and 86c are also connected through circuit breaker 89 that is controlled by switch 90 on the power control box 43 for power control feed to the five heating elements 47 that are normally turned on all the time and also for power supply to the oven light 79. Both of the manually controlled circuit breaker switches 88 and 90 are normally left on all the time. Power that is supplied through circuit breaker 87 for al the heating coil elements 47 controlled by thermostats 67a through 69b is divided and switched through heavy duty contactors 91 of relay 92, 93 of relay 94, 95 of relay 96 and multiple contacts 97 of relay 98. Each of the relays 92, 94 and 96 are equipped with special timed delay circuits 99, 100, and 101 respectively, in order to avoid thermostat contact chattering with the respective thermostats 67a, 68a and 69a near their respectively predetermined set points in controlling heat actuation for the operator's side zone, the middle zone and the blower motor side zone heating coil elements 47 respectively. These circuit features minimize problems of thermostat contact welding and beneficially present an operationally resulting thermostat dead zone of approximately 10° F. and thereby, more reliable, long range operational thermostat performance ensuring through prolonged service life adequately uniform temperature distribution through the oven 25. Relay 98 is provided with a delay circuit 102 having many of the same features as delay circuits 99, 100, and 101 with, however, in this instance the delay circuit 102 providing the same sort of protection for three thermostats 67b, 68b, and 69b in their control of power supply activation to the five heating elements 47 subject to thermostatic control and extending the full width of the heater stack in chamber 45. The indicating lights 84 for the respective thermostat controlled circuits are illustrated as connected in a conventional manner in the circuitry. Conveyor circuitry associated with the conveyor circuit breaker control 103 and switch 104 for conveyor control is not detailed since it is of conventional nature, nor is blower motor circuit breaker control 105 and switch 106 related circuitry detailed for the same reason.

Whereas this invention is here illustrated and described with respect to a specific embodiment thereof, it should be realized that various changes may be made without departing from the essential contributions to the art made by the teachings hereof.

We claim:

1. In a continuous flow mass pin-to-board hot air soldering machine with multiple transversely spaced and longitudinally spaced pin-to-board joints on boards being processed and with a presoldering process supply of solder positioned at each joint to be soldered: a soldering oven with a board feed input opening, and a board output opening; means feeding circuit boards into, through and out of the soldering oven; said oven including, an internal area with baffling and walls defining a hot air circulation path generally in transverse width at least equal to the transverse width of the widest pin-to-board soldered circuit board zone to be processed through the machine; said hot air circulation path including, an air heating chamber with controllable air heating means, a pump chamber with air pumping means, air temperature sensing means, hot air flow channeling means directing hot air flow to a transversely extended hot air outlet positioned for the initial impingement of hot air to the pin-to-board joints being soldered throughout the transverse extent of circuit boards being soldering processed through the machine; control means connected to said controllable air heating means and to said air temperature sensing means, and subject to activation by said air temperature sensing means for controlling the heating of air by said controllable air heating means in said air heating chamber; wherein said controllable air heating means includes a plurality of transversely defined zonal heating element sections; said air temperature sensing means includes a plurality of zonal air temperature sensing devices positioned to sense the downstream temperature of zonal columns of air flow being passed through respective zonal heating element sections; and wherein said hot air flow channeling means directing hot air flow to a transversely extended hot air outlet includes air metering means at said transversely extended outlet.

2. The continuous flow mass pin-to-board hot air soldering machine of claim 1, wherein said hot air flow channeling means and the air metering means are constructed to direct the hot metered air passed thereby at an angle from the vertical relative to boards being passed through the machine slanted toward said board feed input opening.

3. The continuous flow mass pin-to-board hot air soldering machine of claim 2, wherein the angle from the vertical the hot metered air is being passed is approximately 25°.

4. The continuous flow mass pin-to-board air soldering machine of claim 2, wherein bleed air means is provided directing a transversely extended sheet of bleed air toward said board output opening.

5. The continuous flow mass pin-to-board hot air soldering machine of claim 4 wherein said bleed air means includes a bleed air transversely extended channel slanted toward said board output opening and with said bleed air channel being of materially lower air flow capacity than said hot air flow channeling means.

6. The continuous flow mass pin-to-board hot air soldering machine of claim 2, wherein the air metering means is an opening perforated sheet positioned in said transversely extended hot air outlet.

7. The continuous flow mass pin-to-board hot air soldering machine of claim 6, wherein the perforation openings in the perforated sheet and the hot air flow channeling means are slanted at an angle generally at the angle from the vertical that the hot metered air is passed toward the boards being pin-to-board joint solder processed through the machine.

8. The continuous flow mass pin-to-board hot air soldering machine of claim 1, wherein a pin, board and solder heating chamber is provided within the soldering oven with said hot air circulation path passing therethrough and extending from the position of initial impingement of hot air to the pin-to-board joints being soldered adjacent the transversely extended hot air outlet of said hot air flow channeling means through a substantial longitudinal length of the oven to adjacent said board feed input opening; and with said means feeding circuit boards into, through and out of the soldering oven being a conveyor having a circuit board supporting oven approach portion, a portion extending into and through the oven, and an output finish soldered circuit board supporting portion.

9. The continuous flow mass pin-to-board soldering machine of claim 8, wherein speed control means is provided for said conveyor for optimized one pass continuous flow mass pin-to-board hot air solder processing of boards through the machine oven.

10. The continuous flow mass pin-to-board hot air soldering machine of claim 9, wherein the presoldering process supply of solder positioned at each joint to be soldered is in the form of annular solder preforms positioned on each board pin prior to soldering pass of the boards through the machine oven.

11. In a continuous flow mass pin-to-board hot air soldering machine with multiple transversely spaced and longitudinally spaced pin-to-board joints on boards being processed and with a presoldering process supply of solder positioned at each joint to be soldered: a soldering oven with a board feed input opening, and a board output opening; means feeding circuit boards into, through and out of the soldering oven; said oven including, an internal area with baffling and walls defining a hot air circulation path generally in transverse width at least equal to the transverse width of the widest pin-to-board soldered circuit board zone to be processed through the machine; said hot air circulation path including, an air heating chamber with controllable air heating means, a pump chamber with air pumping means, air temperature sensing means, hot air flow channeling means directing hot air flow to a transversely extended hot air outlet positioned for the initial impingement of hot air to the pin-to-board joints being soldered throughout the transverse extent of circuit boards being soldering processed through the machine; control means connected to said controllable air heating means and to said air temperature sensing means, and subject to activation by said air temperature sensing means for controlling the heating of air by said controllable air heating means in said air heating chamber; wherein a pin, board and solder heating chamber is provided within the soldering oven with said hot air circulation path passing therethrough and extending from the position of initial impingement of hot air to the pin-to-board joints being soldered adjacent the transversely extended hot air outlet of said hot air flow channeling means through a substantial longitudinal length of the oven to adjacent said board feed input opening; with said means feeding circuit boards into, through and out of the soldering oven being a conveyor having a circuit board supporting oven approach portion, a portion extending into and through the oven, and an output finish soldered circuit board supporting portion; wherein speed control means is provided for said conveyor for optimized one pass continuous flow mass pin-to-board hot air solder processing of boards through the machine oven; wherein an input depending ribbon air curtain is provided at said oven input opening; and an output depending ribbon air curtain is provided at said oven board output opening.

12. In a continuous flow mass pin-to-board hot air soldering machine with multiple transversely spaced and longitudinally spaced pin-to-board joints on boards being processed and with a presoldering process supply of solder positioned at each joint to be soldered: a soldering oven with a board feed input opening, and a board output opening; means feeding circuit boards into, through and out of the soldering oven; said oven including, an internal area with, baffling and walls defining a hot air circulation path generally in transverse width at least equal to the transverse width of the widest pin-to-board soldered circuit board zone to be processed through the machine; said hot air circulation path including, an air heating chamber with controllable air heating means, a pump chamber with air pumping means, air temperature sensing means, hot air flow channeling means directing hot air flow to a transversely extended hot air outlet positioned for the initial impingement of hot air to the pin-to-board joints being soldered throughout the transverse extent of circuit boards being soldering processed through the machine; control means connected to said controllable air heating means and to said air temperature sensing means, and subject to activation by said air temperature sensing means for controlling the heating of air by said controllable air heating means in said air heating chamber; wherein a pin, board and solder heating chamber is provided within the soldering oven with said hot air circulation path passing therethrough and extending from the position of initial impingement of hot air to the pin-to-board joints being soldered adjacent the transversely extended hot air outlet of said hot air flow channeling means through a substantial longitudinal length of the oven to adjacent said board feed input opening; with said means feeding circuit boards into, through and out of the soldering oven being a conveyor having a circuit board supporting oven approach portion, a portion extending into and through the oven, and an output finish soldered circuit board supporting portion; wherein speed control means is provided for said conveyor for optimized one pass continuous flow mass pin-to-board hot air solder processing of boards through the machine oven; wherein a transversely extended curved projection is provided projecting partially into the flow of hot air being passed by said hot air outlet from the oven board feed input opening side of said hot air outlet; and with said transversely extended curved projection providing a curved surface aiding in the guiding of hot air flowing from said hot air outlet and minimizing of turbulence in the hot air flow from the hot air outlet feed point.

13. The continuous flow mass pin-to-board hot air soldering machine of claim 4, wherein said controllable air heating means also includes a plurality of heating coil elements extended substantially the entire transverse width of said air heating chamber; and with at least some of said heating coil elements being subject to control by temperature sensing devices with each having a temperature sensing projection to within said plenum chamber.

14. The continuous flow mass pin-to-board hot air soldering machine of claim 13, wherein said temperature sensing devices are thermostats; and including means mounting circuit boards being pin soldered in parallel spaced relation to the upper surface of a conveyor belt of said conveyor.

References Cited

UNITED STATES PATENTS

| | | | |
|---|---|---|---|
| 3,092,059 | 6/1963 | Tesch | 228—37 |
| 3,100,471 | 8/1963 | Gutbier | 228—37 |
| 3,218,193 | 11/1965 | Isaacson | 228—37 |
| 3,214,566 | 10/1965 | Wilson | 219—392 |
| 3,386,166 | 6/1968 | Tardoskegyi | 228—36 |

JOHN F. CAMPBELL, Primary Examiner

R. J. CRAIG, Assistant Examiner

U.S. Cl. X.R.

219—392, 413; 228—20, 37